(12) United States Patent
Dugas et al.

(10) Patent No.: US 7,762,231 B2
(45) Date of Patent: Jul. 27, 2010

(54) VEHICLE WITH CONTACTLESS THROTTLE CONTROL

(75) Inventors: David Dugas, Mansfield, MA (US); Craig Bliss, Taunton, MA (US); Peter S. Hughes, South Harwich, MA (US)

(73) Assignee: Vectrix International Limited, Hong Kong (HK)

( * ) Notice: Subject to any disclaimer, the term of this patent is extended or adjusted under 35 U.S.C. 154(b) by 236 days.

(21) Appl. No.: 11/762,596

(22) Filed: Jun. 13, 2007

(65) Prior Publication Data

US 2008/0114523 A1  May 15, 2008

Related U.S. Application Data

(63) Continuation of application No. PCT/US2007/070980, filed on Jun. 12, 2007.

(60) Provisional application No. 60/813,364, filed on Jun. 14, 2006.

(51) Int. Cl.
*F02D 11/10* (2006.01)
*G06F 19/00* (2006.01)
(52) U.S. Cl. .......................... 123/399; 701/101
(58) Field of Classification Search ............ 123/399, 123/396, 361, 337; 701/101, 102
See application file for complete search history.

(56) References Cited

U.S. PATENT DOCUMENTS

| | | | |
|---|---|---|---|
| 6,144,125 A | 11/2000 | Birkestrand et al. | 310/68 B |
| 6,326,765 B1 | 12/2001 | Hughes et al. | 320/104 |
| 6,446,600 B1 * | 9/2002 | Scherer et al. | 123/399 |
| 6,581,714 B1 | 6/2003 | Kamen et al. | 180/333 |
| 6,724,165 B2 | 4/2004 | Hughes | 318/376 |
| 2004/0107789 A1 | 6/2004 | Peppard | 74/484 R |
| 2005/0251301 A1 | 11/2005 | Suzuki | 701/23 |

FOREIGN PATENT DOCUMENTS

| | | |
|---|---|---|
| EP | 0 687 588 | 12/1995 |
| EP | 1 553 277 | 7/2005 |
| EP | 1 647 435 | 4/2006 |
| JP | 8-241806 A * | 9/1996 |

OTHER PUBLICATIONS

International and Partial International Search Reports for PCT/US2007/070980.

* cited by examiner

*Primary Examiner*—Hieu T Vo
(74) *Attorney, Agent, or Firm*—Stephen C. Beuerle; Procopio Cory Hargreaves & Savitch LLP (57) ABSTRACT

A vehicle power control that includes a throttle mounting portion and a throttle that is movably mounted to the throttle mounting portion and configured for manipulation and operation by a rider. The power control also includes a sensor in contactless association with at least one of the throttle and throttle mounting portion. The sensor is configured for sensing a position of the throttle with respect to the mounting portion, in the contactless association, and generating a signal based on the sensed position for controlling motive power of a vehicle.

20 Claims, 9 Drawing Sheets

VEHICLE WITH CONTACTLESS THROTTLE CONTROL

CROSS-REFERENCE TO RELATED APPLICATION

This application is a continuation of International Application PCT/US07/70980 filed Jun. 12, 2007, which claims the benefit of priority to provisional application no. 60/813,364, filed Jun. 14, 2006, the contents of which are hereby incorporated herein by reference thereto.

FIELD OF THE INVENTION

The present invention relates generally to a control for powering a vehicle, and more particularly, a contactless vehicle power control.

BACKGROUND OF THE INVENTION

Vehicles are known with throttle controls that are mechanical and electrical. An example of an electrical throttle control is in U.S. Pat. No. 6,581,714, which describes a steering control of a personal transporter, where the steering device uses a potentiometer coupled to the handlebar for generating a steering command upon rotation. U.S. Pat. No. 6,724,165 discloses a vehicle that uses a potentiometer as means of producing control command. In particular, the throttle is coupled to a potentiometer, where the rotation of the throttle from neutral position in one direction demands vehicle acceleration, while the rotation of throttle in second direction demands regenerative breaking.

Depending on the angular span of the actuating device, such as a throttle, a mechanical amplification is often used to map the mechanical domain of the actuation device to the electrical domain of the potentiometer. Due to the nature of the potentiometer, contact erosion is also possible. Throttle controls that rely on contact between an manipulable portion and a potentiometer or other throttle position-sensing device can have poor calibration retention due to sensitivity to environmental conditions, and can wear mechanical connections.

Thus, there remains a need to have a vehicle control where the actuating device is in contactless association with a sensing device, which can enable simple, lasting, and accurate means of vehicle control.

SUMMARY OF THE INVENTION

The present invention relates to a vehicle power control that includes a throttle mounting portion, a throttle movably mounted to the throttle mounting portion and configured for manipulation and operation by a rider, and a sensor in contactless association with at least one of the throttle and throttle mounting portion. The sensor is configured for sensing a position of the throttle with respect to the mounting portion, in the contactless association, and generating a signal based on the sensed position for controlling motive power of a vehicle.

Advantageously, the sensor is configured for sensing an absolute position of the throttle without requiring movement of the throttle such as upon powering up the sensor. The vehicle power control system may also include a magnetic member having a magnetic field and associated with at least one of the throttle and the throttle mounting portion. In this arrangement, the sensor is configured to sense the magnetic field to sense the position of the throttle. Preferably, the sensor is configured for sensing the orientation of the magnetic field to sense the position of the throttle.

The vehicle power control system also may include a support member for supporting one of the magnetic member and sensor and for moving said one with respect to the other to orient the magnetic field in a predetermined orientation when the throttle is in a predetermined position. This support member includes a locking member configured for locking the support member in a predetermined position. When a predetermined position is obtained, the locking member retains the orientation of the magnetic member with respect to the sensor and with the throttle in a predetermined position for calibrating the sensor. The power control system further includes a threaded member having threads and affixed to the throttle, such that the support member is in threaded association with the threaded member. Preferably the support member includes first and second threaded portions that are flexible with respect to each other and that are in a threaded association with the threaded member. Locking member is preferably configured for flexing the first and second flexible portions with respect to each other for gripping threads of the threaded member to rotationally lock the support member with respect to the throttle. An advantageous feature of the locking member is a fastener that is configured for affixing the lock member by biasing apart the first and second flexible portions with respect to each other.

The magnetic member generally has magnetic poles so that the magnetic field at the sensor changes orientation as the throttle is moved. As the throttle is rotatable about an axis, a convenient arrangement is for the magnetic poles to be disposed at different radial and circumferential locations with respect to the axis, such as at different eccentric locations. Conveniently, the magnetic member can be or include a permanent magnet.

In another embodiment, the sensor includes at least one Hall effect sensor. Preferably, the sensor includes a differential Hall effect sensor, such as a differential Hall effect sensor configured for sensing an absolute orientation of the magnetic field without requiring movement of the throttle. The signal from the sensor can be a pulse-width modulated signal in which the pulse width is related to the sensed position.

The throttle further also may include a throttle biasing assembly to resiliently bias the throttle towards a neutral position with respect to the sensor. This biasing assembly is configured for applying a lesser bias to the throttle toward the neutral position when the throttle is displaced from the neutral position on a first side of neutral than when the throttle is displaced from the neutral position on a second side of neutral. Preferably, positioning the throttle in the first side causes the vehicle engine or motor to provide forward propulsion power acceleration, and positioning the throttle in the second side activates regenerative braking or reverse propulsion power from the engine or motor.

The biasing assembly generally includes a first biasing member configured to bias the throttle in a first direction from the first side toward the neutral, and a second biasing member configured to bias the throttle in a second direction, opposite the first direction. The biasing assembly preferably provides greater bias when the throttle is on the second side than on the first side. In an alternative embodiment, the power control has a first and second biasing member, but the sensor does not have to be in contactless association with one of the throttle and throttle mounting portion.

The biasing assembly is preferably configured such that the first biasing member is in biasing association with the throttle when the throttle is on both the first and second sides, and the second biasing member is in biasing association with the throttle when the throttle is on the second side and is disengaged from the throttle when the throttle is on the first side. The sensor may be mounted to the throttle mounting portion and be in contactless association with the throttle.

The preferred vehicle includes the vehicle power control, a motor configured for providing motive power to the vehicle, and a controller connected to receive the signal from the sensor and to cause the motor to operate at a power level or in a mode depending on the position of the throttle. The preferred vehicle further includes handle bars configured for steering the vehicle, with the sensor associated with the handle bars, and with a twist throttle mounted to the handle bars for operating the power and steering the handle bars.

The present invention thus provides an improved vehicle power control that can allow, for example, improved reliability and stability wherein the sensor is in contactless association with the throttle for generating a signal based on the sensed position thereof.

DETAILED DESCRIPTION OF THE PREFERRED EMBODIMENTS

Figure 1:
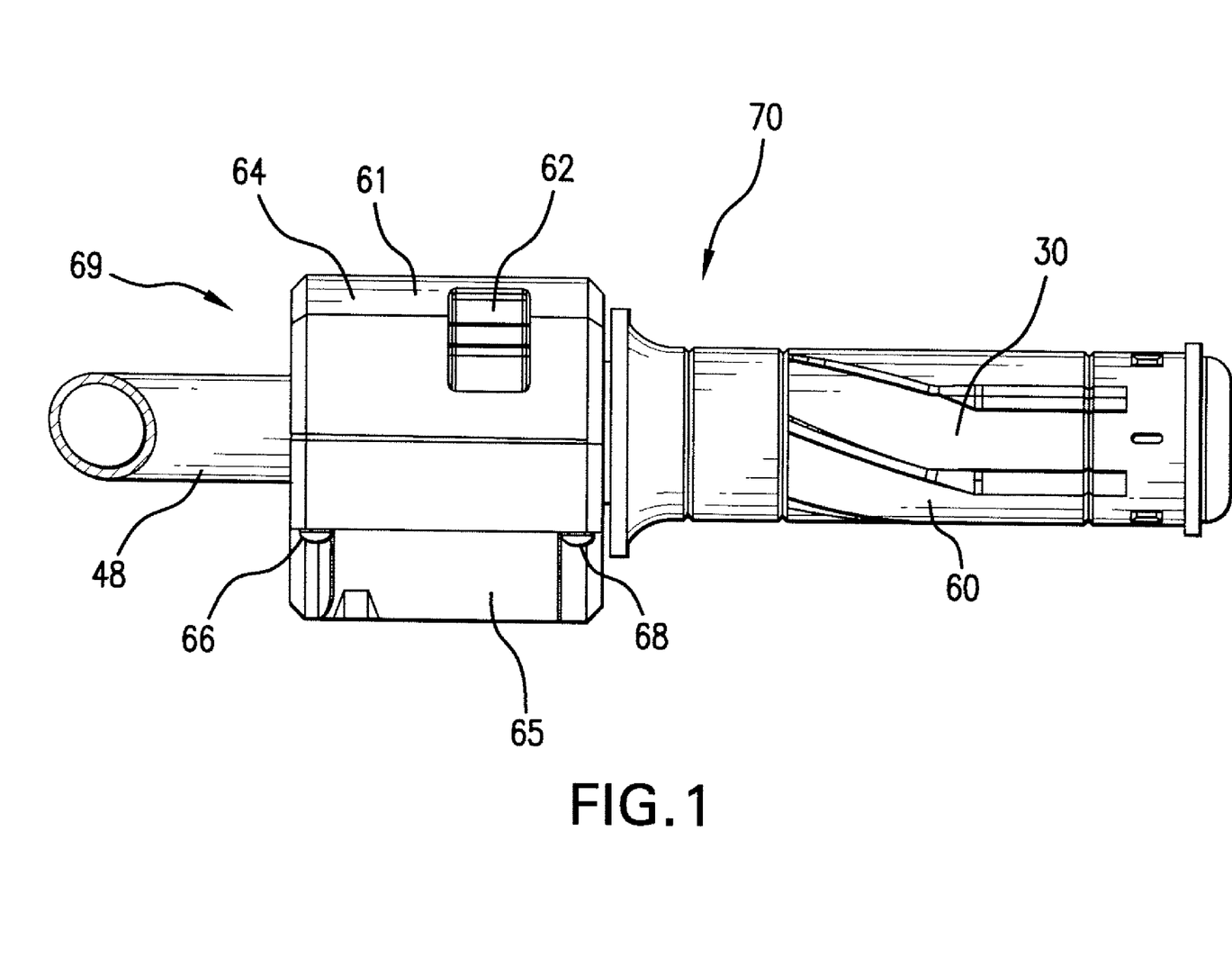
FIG. 1 is a rear view of an embodiment of a vehicle power control constructed according to the present invention.

Referring to FIG. 1, a preferred embodiment of a vehicle power control 70 includes a throttle mounting portion and a throttle. The throttle mounting portion 69 includes a handle bar 48 on which the throttle housing 61 is mounted. Throttle housing 61 preferably includes an upper housing 64 and a lower housing 65, which are preferably fastened together, such as by fastener 66 and 68. An emergency kill switch 62 is disposed on the throttle housing 61, accessible for operation preferably with a rider's thumb, but can alternatively be disposed in other locations. A grip 60 is mounted on the throttle 30 (see FIG. 2) to allow for easy grasping and rotation of the throttle. A grip 60 is mounted on the throttle 30 to allow for easy grasping and rotation of the throttle. Preferred grip 60 is made from an elastomer material, although other materials can be used as known in the art.

Figure 2:
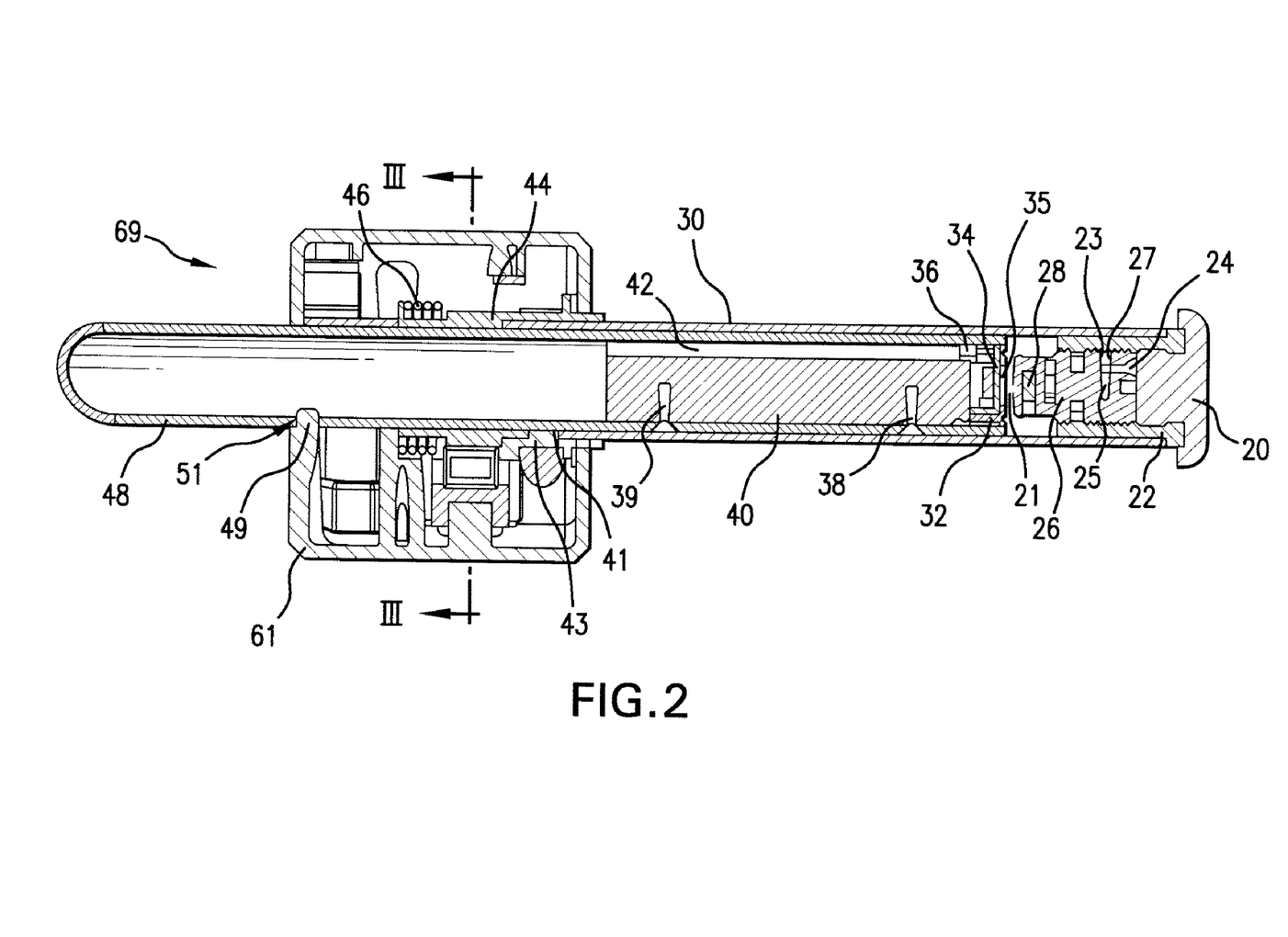
FIG. 2 is a cross-sectional view thereof.

As shown in FIG. 2, sleeve 22 is preferably fixed within throttle 30, and is threaded internally. Magnetic support plug 26 is received, in threaded association, in the sleeve 22 so that it can be rotated therein. The magnetic support plug 26 includes flexible members, which are preferably threads, that define gaps 19 therebetween. The gaps allow for shrinkage or other variability in size of the flexible members during forming, for example by injection molding, of the magnetic support plug 26. One the of the gaps is preferably a lock gap 25, which is preferably larger than the other gaps. The lock gap 25, together with a fastener, for example locking screw 24, facilitates affixing in position the magnetic support plug 26 within the sleeve 22. The flexible members of the magnetic support plug 26 are sufficiently flexible such that the walls 23, 27 of the lock gap 25 preferably sway apart under influence of the locking screw 24. By biasing apart the walls 23 and 27, the locking screw 24 imparts additional pressure on the threads of the magnetic support plug 26 and prevents further rotation thereof within the sleeve.

Figure 5:
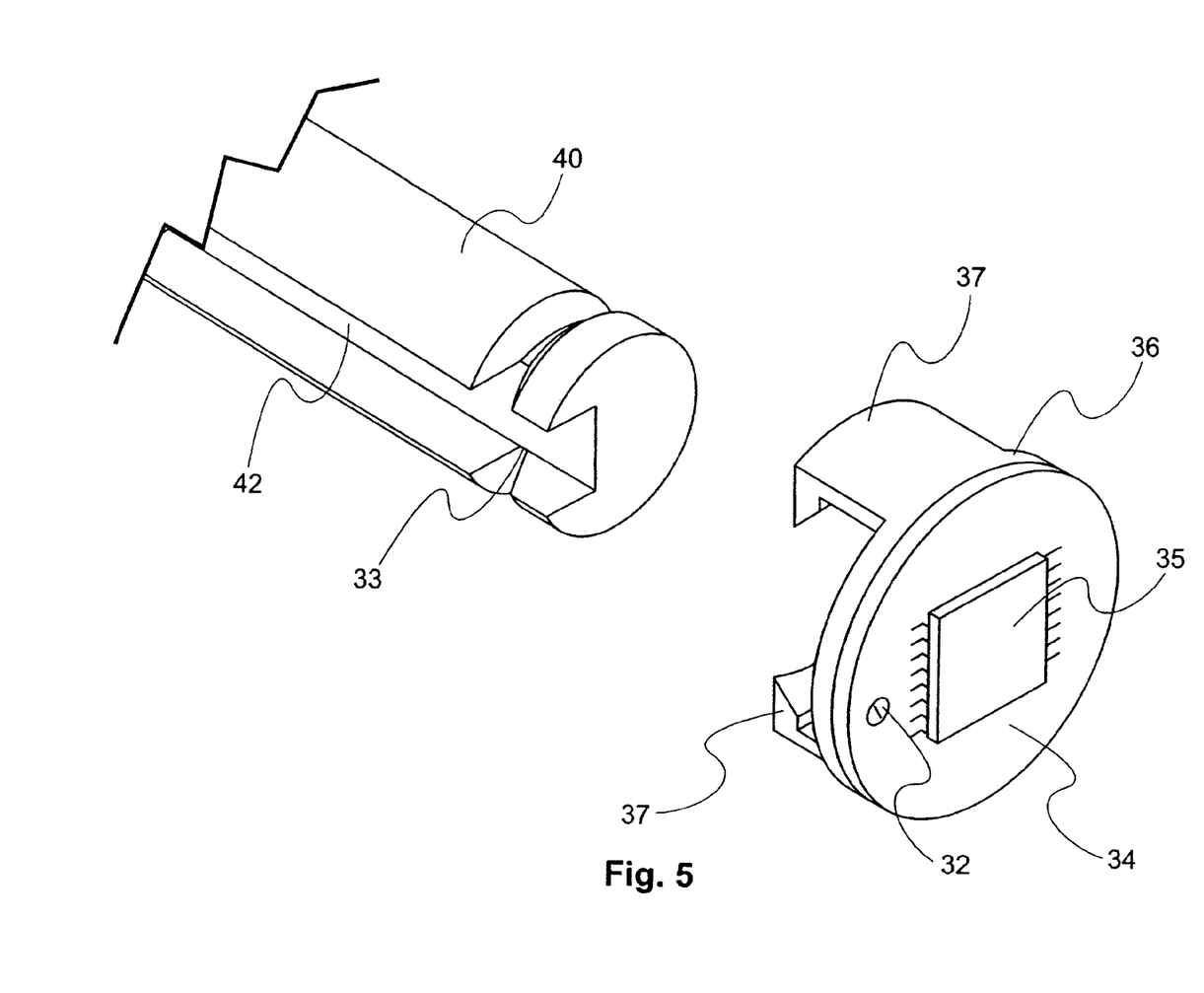
FIG. 5 is a perspective view of an embodiment of a printed circuit board retainer constructed according to the present invention.

Preferably, sensor printed circuit board (PCB) 34 includes a throttle position sensor 35 mounted thereon. The sensor PCB 34 is preferably affixed to the PCB retainer 36 by means of the PCB retainer screw 32. As shown in FIG. 5, the PCB retainer 36 is preferably in snap-fit association with the harmonic dampening weight 40, which itself can be affixed to the handle bar 48 by means of fasteners 38 and 39. The retainer 36 includes a pair of extension legs 37, which are preferably resilient and configured for snap and fit association around groove 33 of the harmonic dampening weight 40. The retainer 36 is preferably associated with the dampening weight 40 such that wires of the sensor 35 that extend from the bottom of the PCB 34 are able to extend along the sensor wire slot 42 of the weight 40. The throttle mounting portion 69 is preferably operably designed and configured to mount the throttle 30 to the handle bar 48. The throttle 30 is preferably received within the housing 61 and preferably coaxial therewith, although the throttle 30 can be received in other positions and or orientations. The preferred throttle 30 is a twist throttle, which receives the handle bar 48 for rotation thereabout.

As shown generally in FIGS. 2-6, the handle bar 48 includes an opening 51 that is preferably configured to receive lower housing protrusion 49 and lock the lower housing 65 against rotational and lateral movement of the throttle housing 61 with respect to the handle bar 48. Preferably, when the upper housing 64 is joined to the lower housing 65, the throttle housing 61 houses forward travel spring 46 and the throttle bias member 44. The throttle bias member 44 is mounted on the handle bar 48 and is preferably configured to slidably receive the throttle 30 with protrusion 43 mating with locking hole 41, such that the throttle bias member 44 is rotationally coupled or fixed with throttle 30 and can be rotated for rotation about the handle bar 48 to couple the bias member 44 to the throttle.

Figure 3:
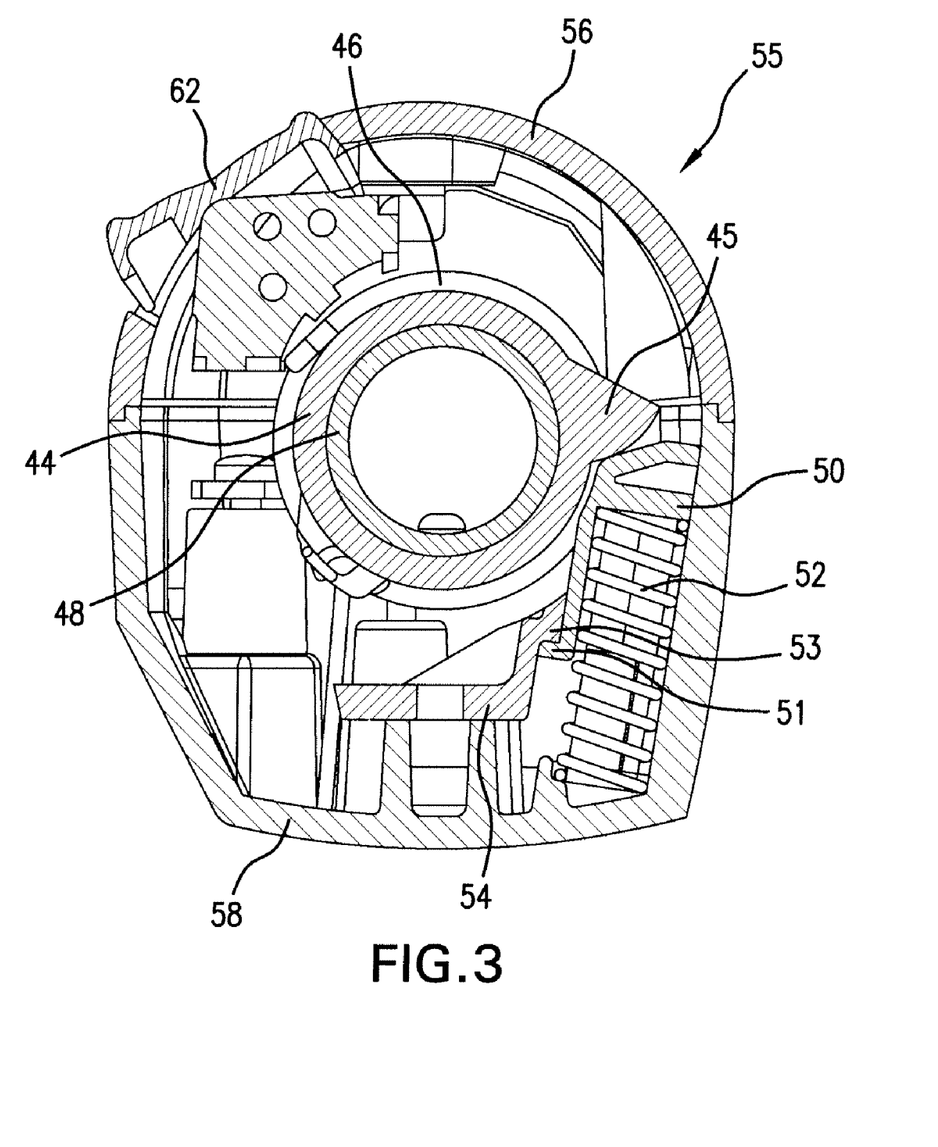
FIG. 3 is a cross-sectional view along plane III-III thereof.

Preferably, the forward travel spring 46 is seated against the throttle housing 61 and throttle bias member 44 to rotationally bias the throttle 30 toward the neutral position, when the throttle 30 is on a first side of the neutral position that would cause the motor to propel the vehicle in a forward direction. The preferred forward travel spring is a coil spring mounted coaxially about the handle bar 48, but other spring or biasing members can be used.

A reverse travel spring limiter 50 preferably houses a reverse travel spring 52 and is moveable in a direction to compress the reverse travel spring 52, but is prevented from moving in a direction to allow reverse travel spring 52 to expand past a limit position. When displaced from this limit position, reverse travel spring 52 biases reverse travel spring limiter 50 against arm 45 to bias the throttle 30 towards the neutral throttle position. Preferably, when the throttle is moved to this position, arm 45 pushes and cams the limiter 50 to compress spring 52. The reverse travel spring limiter 50 and reverse travel spring 52 are preferably disengaged from the throttle 30 when the throttle is rotated to the forward side of its movement range. The reverse travel spring limiter 50 preferably has a ledge 51 that protrudes laterally from its direction of motion to engage retainer ledge 53 of the housing 61 to limit the maximum extension of the reverse travel spring limiter 50. The forward travel spring 46 is preferably configured to exert a softer bias against the throttle than the reverse travel spring 52. In forward side, the throttle 30 is biased only by the forward travel spring 46, but in the reverse side, both forward travel spring 46 and reverse travel spring 52 act against the throttle 30 and against each other. However, reverse travel spring 52 is, sufficiently stiff to overcome forward travel spring 46 and create a stiffer bias toward neutral than the forward travel spring 46 does when throttle 30 is in forward side. Thus, the throttle biasing assembly 55 resiliently biases the throttle towards the neutral position and preferably applies a lesser rotational bias to the throttle 30 toward the neutral position when the throttle is displaced in the forward travel side thereof than when the throttle 30 is displaced from the neutral position in the reverse travel side thereof.

The throttle position sensor 35 is in contactless association with at least one of the throttle 30 and the throttle mounting portion 69, and as discussed above, is preferably mounted to the handle bar 48, and in contactless association with throttle 30. The throttle position sensor 35 is preferably configured for sensing a position of the throttle 30 with respect to the mounting portion 69, and generating a signal based on the sensed position for controlling motive power of the vehicle. The throttle position sensor 35 is preferably configured for sensing an absolute position of the throttle 30 without requiring relative movement of the throttle 30, such as without requiring initial homing movement of the throttle 30. A sensed member, which is preferably a magnetic member 28 that has a magnetic field and is associated with the one of the throttle 30 and the throttle mounting portion 69, other than the one to which the throttle position sensor 35 is mounted. Preferably, the throttle position sensor 35 is configured to sense the magnetic field, across a contactless gap 21, to sense the position of the throttle 30. The throttle position sensor 35 is preferably configured for sensing the orientation of the magnetic field to sense the position of the throttle 30. In the preferred embodiment, the sensor 35 is mounted to the throttle mounting portion 69 and is in contactless association with the throttle 30. Alternatively, the sensor can be mounted to throttle 30 and the signal from the throttle position sensor 35 can be transmitted across the contactless gap 21 by wireless communication or other means known in the art.

Figure 4:
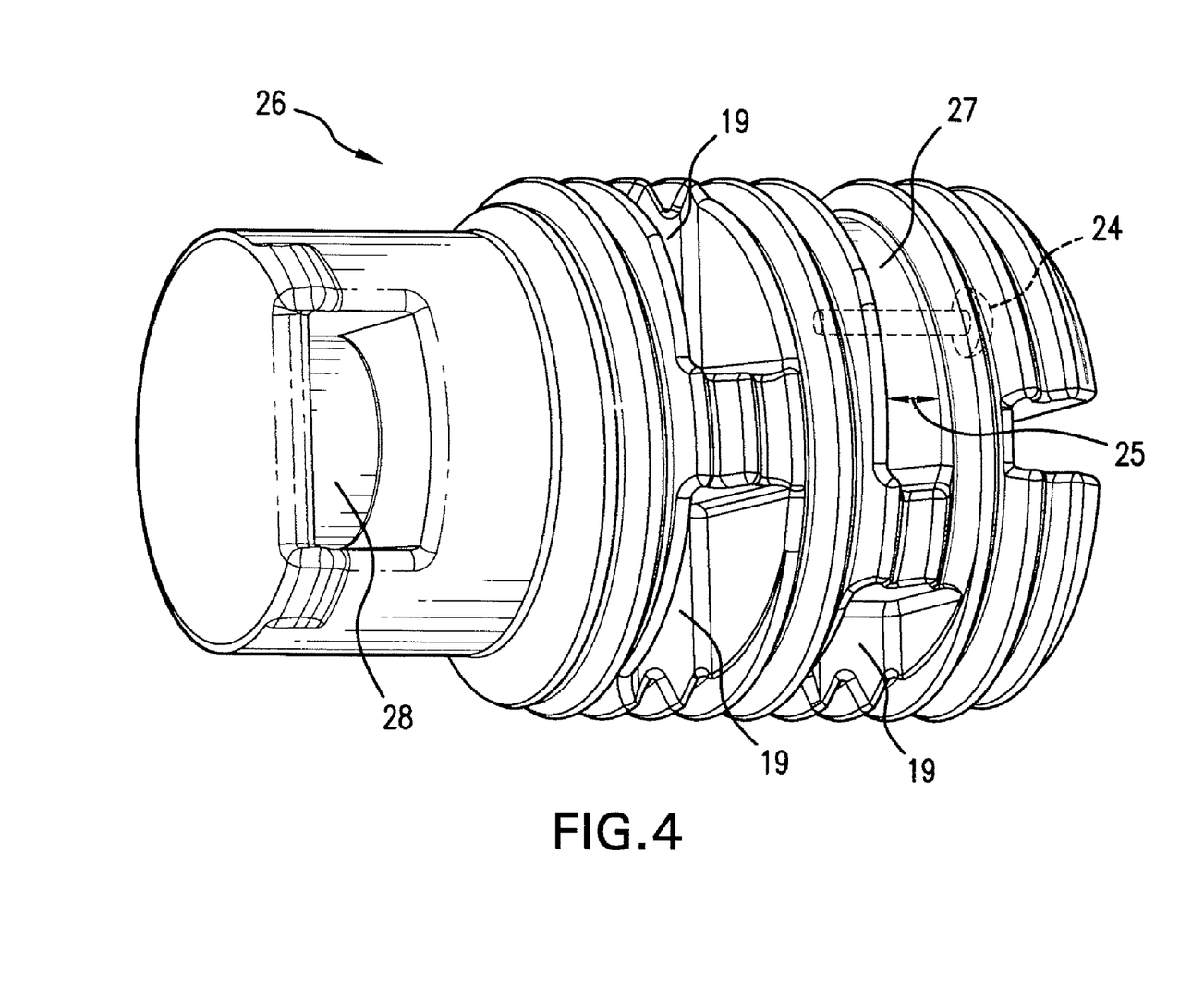
FIG. 4 is a perspective view of an embodiment of a magnet support plug constructed according to the present invention.
Figure 6:
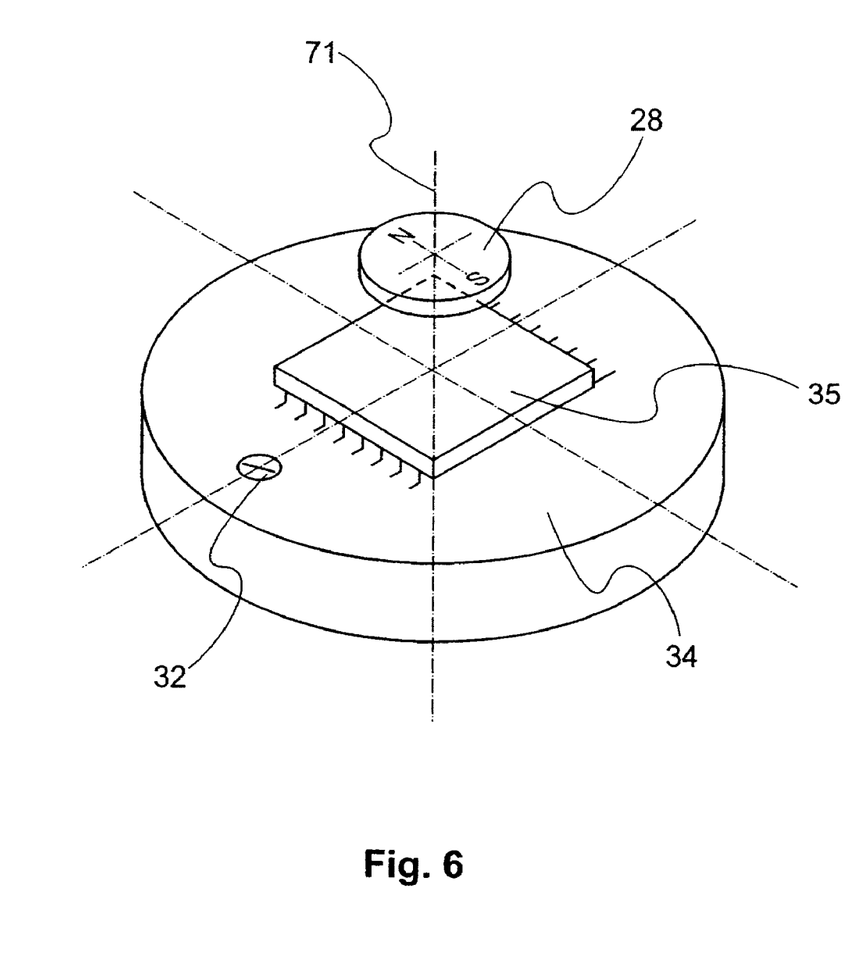
FIG. 6 is a perspective view of an embodiment of a sensor constructed according to the present invention.

As shown in the preferred embodiment of FIGS. 4 and 6, the magnetic member 28 is a cylindrical magnet with a cylindrical axis 71, although other shapes of magnets can alternatively be used. The magnetic member 28 is preferably a permanent magnet of a magnetic material, such as AlNiCo, SmCo5, or NdFeB. Typically, the magnet is about 5-7 mm in diameter and about 2-4 mm in height, while the dimensions can be varied depending on the configuration of the throttle assembly. The magnetic poles can be disposed at different locations with respect to the axis of rotation. The magnetic poles can also be disposed at different eccentric locations with respect to the axis 71. In the preferred embodiment, the magnetic poles are disposed radially symmetrically with respect to axis 71. Most preferably, the axis of rotation is coaxial with the cylindrical axis 71 and/or the throttle axis of rotation. Other embodiments include configurations with various different spatial relationship between the magnetic member and the sensor. For example, in one embodiment the relationship between the magnetic field at the sensor and the change in orientation of the throttle is sufficiently nonlinear such that electronics or other means of compensation may be required to determine the position of the throttle.

In the embodiment shown in FIG. 6, the throttle position sensor 35 is mounted generally centrally on the sensor PCB 34, with the magnetic member disposed adjacent thereto, but without contacting the throttle positioning sensor 35. Preferably, the throttle position sensor 35 comprises one or more Hall effect sensors, which can be provided as a differential hall effect sensor. The differential hall effect throttle position sensor 35 may be configured for sensing an absolute orientation without requiring movement of the throttle. In the preferred embodiment, the throttle position sensor 35 is a AS5040 10-bit programmable magnetic rotary encoder available from Austriamicrosystems, but other sensors with similar characteristic can be used. Preferably, the vertical distance between the magnetic member 28 and the throttle position sensor 35 should be about 0.5 mm to 2.5 mm, and more preferably about 1.8 mm. The magnetic member axis 71 is preferably aligned within about 0.10 mm and 0.50 mm, and more preferably within about 0.25 mm, of the center of the throttle position sensor 35. Dimensions can be varied depending on types of magnet used and the configuration of the throttle assembly. In the preferred embodiment, the signal from the throttle position sensor 35 is a pulse-width modulated signal in which the pulse-width modulated signal is related to the sensed position. Alternative output signal from the throttle position sensor 35 can be, for example, a serial bit stream.

In the preferred embodiment, the throttle position sensor 35 is calibrated by rotating the threaded magnetic support plug 26, which carries the magnetic member 28, with respect to throttle 30 and/or the sensor, and fixing in position with respect to the throttle 30 by tightening the locking screw 24 when a desired signal is received from the sensor 35 and the throttle 30 is in the neutral or predetermined position.

In the preferred embodiment, vehicle power control 70 controls the motive power of a vehicle. The vehicle preferably includes a motor configured for providing motive power to the vehicle, and a controller connected to receive the signal from the throttle position sensor and configured to cause the motor to operate at a power level depending on the position of the throttle. Preferably, the vehicle further includes the handle bar/sensor/throttle assembly, as described above. More preferably, the vehicle is an electric scooter, such as described in U.S. Pat. No. 6,047,786, the content of which is expressly incorporated herein by reference thereto. In the preferred embodiment, the scooter has two wheels, a front steerable wheel and rear drive wheel, however, the present invention can be incorporated in vehicles having multiple wheels, for example, those having three, four, or more wheels.

Figure 7:
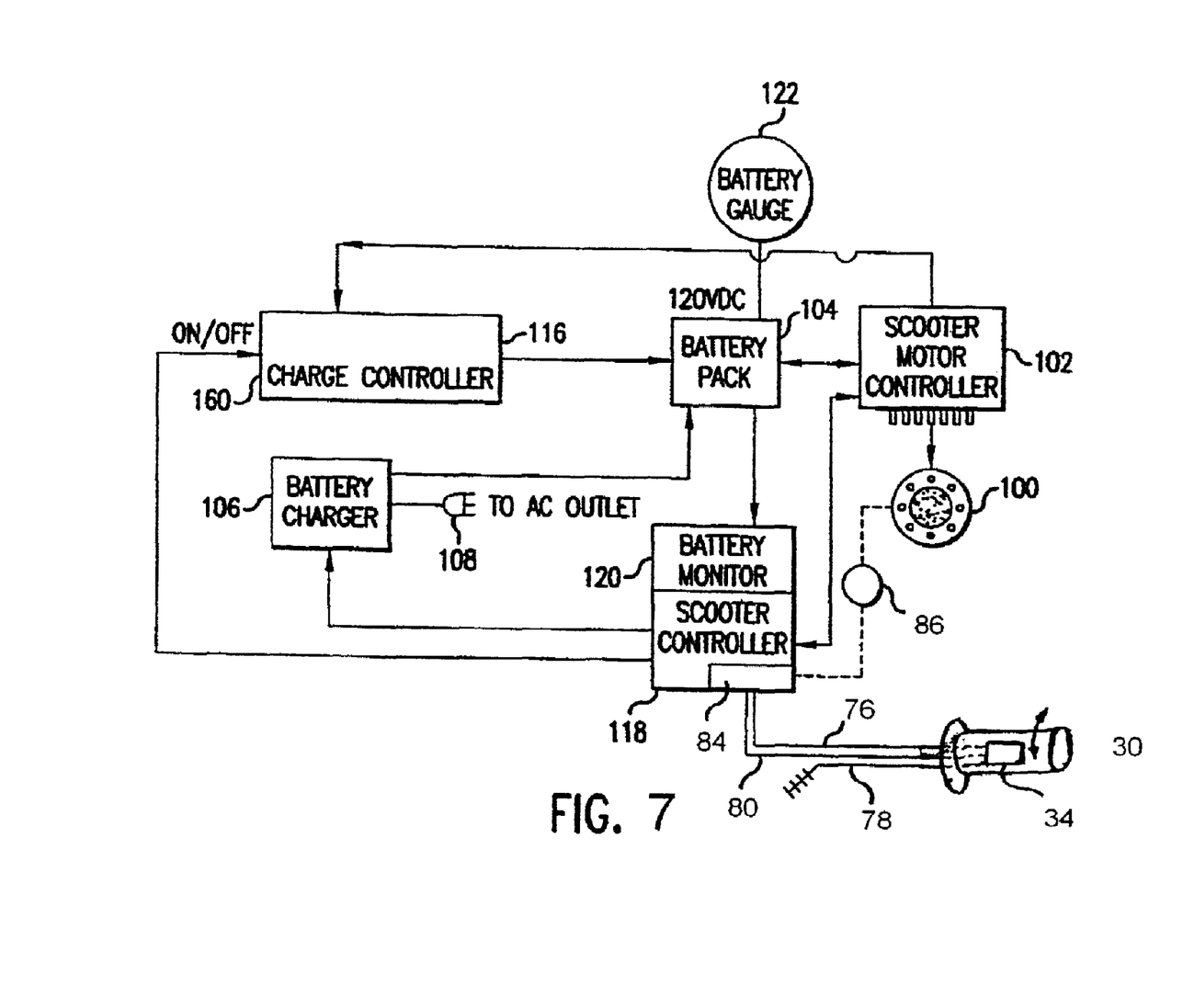
FIG. 7 is a block diagram showing components used to power an embodiment of a vehicle constructed according to the present invention.

Referring to FIG. 7, while the vehicle of the present invention can be powered by a variety of suitable power plants, such as internal combustion engines, a preferred embodiment is powered by an electric motor 100. Motor 100 can be a three-phase, slotted, brushless, permanent magnet motor, as described in U.S. Pat. No. 6,326,765, the content of which is expressly incorporated herein by reference thereto. Other embodiments can include motors with different specifications and configurations. In particular, motors having different numbers of poles, or having greater or lesser power and torque, can be used.

In the preferred embodiment of a scooter, motor 100 receives a three-phase voltage from motor controller 102. The motor controller 102 has the battery DC voltage as its input and converts the battery voltage to a three-phase output to the motor 100. Alternatively, capacitors can provide DC voltage to the motor controller 102 instead of batteries or in combination with batteries. Preferably, motor controller 102 outputs a modulated signal, such as pulse width modulation, to drive the scooter motor 100. The motor controller 102 preferably includes high-power semiconductor switches which are gated (controlled) to selectively produce the waveform necessary to connect the battery pack 104 to the scooter motor 100. Other embodiments can use different suitable controllers or similar devices as known in the art.

The throttle position sensor 35 is preferably operably configured to translate a rider input from the throttle 30 into an electrical signal to operate in a forward traveling mode, a reverse traveling mode, a regenerative braking mode, or a combination thereof. In the regenerative braking mode the signal is transmitted to a regenerative braking control module 84, including a microprocessor on the scooter controller 118. Preferably, sensor PCB 34 has three wires: a power lead 76, a ground 78, and a signal wire 80. The wires are preferably arranged to exit through the sensor wire slot 42, as shown in FIG. 5. The control module 84 further receives input signals from at least one process monitoring sensor 86. The process monitoring sensor 86 preferably provides instrumentation data such as drive wheel speed, front wheel speed, and vehicle accelerometer measurements.

The braking system can be configured to apply a regenerative braking torque to the drive wheel when the sensor 35 signals a regenerative braking command and the process sensors signal a drive wheel velocity that is greater than zero. A preferred embodiment of regenerative braking system is described in U.S. Pat. No. 6,724,165, the content of which is expressly incorporated herein by reference thereto. Preferably, the braking torque increases with an increase in a signal from the sensor 35 as controlled by the rider. In essence, during the regenerative braking mode, the motor preferably acts as a generator supplying current to the battery, which loads down the generator and thereby causes a braking action.

Battery pack 104 preferably includes sufficient batteries connected in series to provide at least 100 VDC, although alternative embodiments can provide lesser voltages. The battery pack 104 preferably includes nickel metal hydride (Ni-MH) batteries, for example, 30 amp-hour, 120 volt Ni-MH batteries, although other battery types, such as lead-acid batteries, Ni—Zn batteries, or lithium ion batteries, can also be used. Regardless of which types of batteries are used, the batteries of the present invention are preferably rechargeable. In one embodiment, a battery charger 106 is used to recharge battery pack 104. Battery charger 106 preferably resides onboard the scooter and is connectable to an AC outlet via a plug 108 or the like. Alternatively, the battery charger 106 can be separate from the scooter and is connected to the scooter only during, for example, high-current charging sessions.

Scooter controller 118 preferably sends signals to the motor controller 102, the battery charger 106 (when provided on-board the scooter), and the charge controller 160. The charge of the battery pack 104 is monitored via a battery monitor 120, which in turn is connected to the scooter controller 118 to provide information which can affect the operation of the scooter controller 118. The energy state of the battery pack 104 is displayed on a battery gauge 122 so that the rider can monitor the condition of the battery pack 104.

Charge controller 160 is capable of controlling power to a nominal 120 volt DC battery pack, which can be, for example, the battery pack 104. A preferred embodiment of charge controller 160 is described in U.S. Pat. No. 5,965,996, the content of which is expressly incorporated herein by reference thereto. While several suitable charging schemes can be used, the charge controller 160 preferably charges a battery pack by first using a constant current until the battery pack reaches about 140 volts, then applying a constant voltage at about 140 volts, and then reapplying a constant current until the battery pack reaches about 156 volts. Each of these voltage set points can be specified and varied under the control of the scooter controller 118. Battery gauge 122 is preferably provided to show the battery and charging status.

Figures 8, 9:
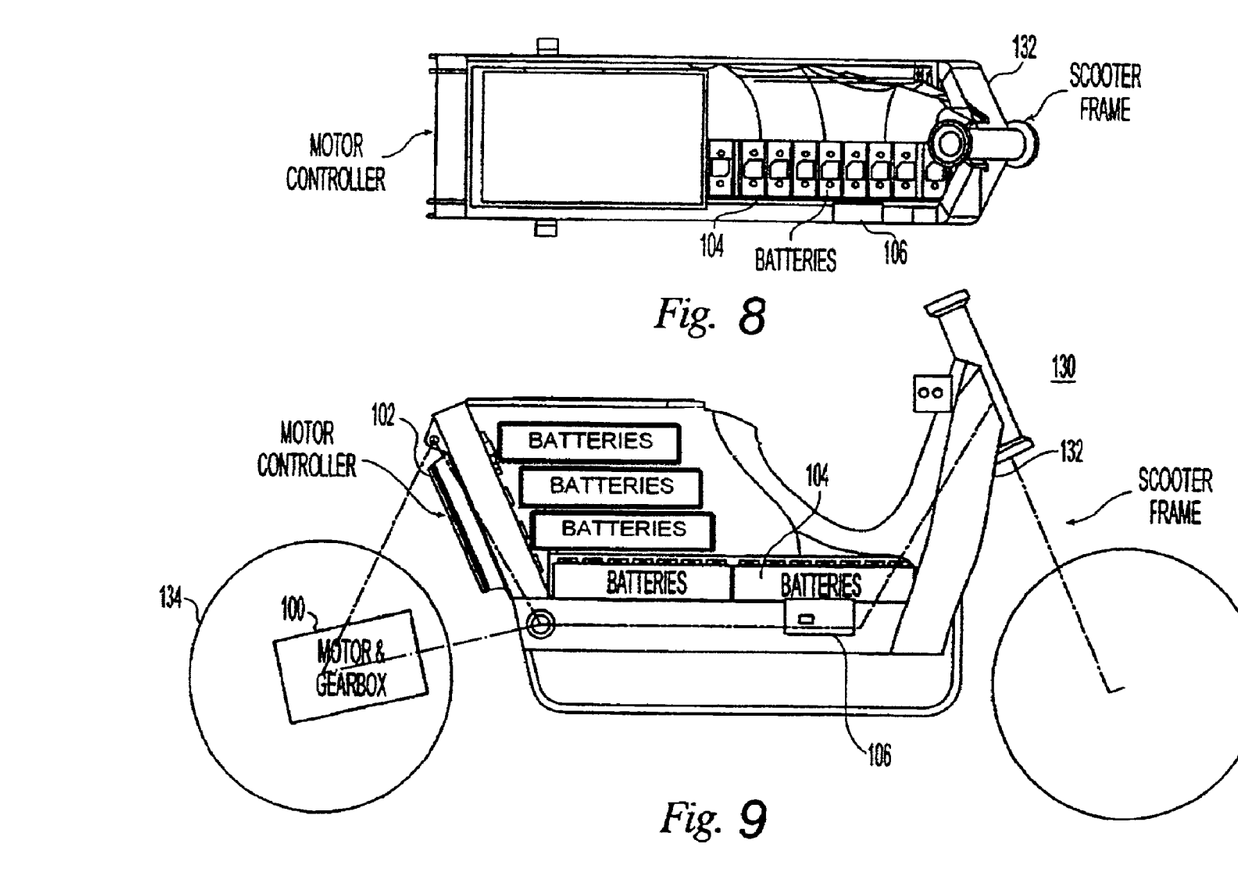
FIGS. 8 and 9 are side and top schematic views, respectively, of a vehicle frame thereof.

Referring to FIGS. 8 and 9, a preferred embodiment of a scooter 130 has a scooter frame 132, such as disclosed in U.S. Pat. No. 6,047,786. The scooter motor 100, along with its associated gear box, drives the rear wheel 134 of the scooter, and is preferably positioned in the vicinity of the frame 132 and the rear wheel 134. The battery pack 104 is preferably arranged low in the frame 132 to provide a relatively low scooter center of gravity. While FIGS. 8 and 9 show the battery pack 104 to be a linear arrangement of batteries having substantially similar vertical positions, in other embodiments the batteries can be arranged in different configurations so as to optimize space in the scooter frame. For example, a scooter frame can preferably include nickel metal hydride (Ni-MH) batteries, for example, 30 amp-hour, 120 volt Ni-MH batteries. In other embodiments, the scooter can hold about 10 12-volt sealed lead-acid (SLA) batteries, each battery having about a 16 amp-hour rating for a total of approximately 1.9 kilowatt hours at 120 volts. Alternatively, each battery can have a rating of about 26 amp-hours for a total of 3.1 kilowatt hours at 120 volts. Because the 26 amp-hour batteries, however, are larger than the 16 amp-hour batteries, the larger batteries occupy more space within the frame.

In a first preferred embodiment, the battery supply 104 includes 30 amp-hour, 120 volt Ni-MH batteries. In alternative embodiments, the battery supply can include lead acid 16 or 18 amp-hour batteries. The lower amp-hour rating batteries are preferably used when the scooter is designed to commute only a small distance within an urban area, whereas the 26 amp-hour batteries are preferably used when the scooter is designed to travel in suburban as well as rural areas with a longer commuting distance. In another embodiment, nickel zinc (Ni—Zn) batteries or lithium ion batteries can be used instead of the lead-acid type. Alternative embodiments can also include other types of batteries or power storage devices.

In the preferred embodiment, a battery charger is preferably included to charge the batteries from an external power source. The battery charger can preferably be plugged into a 120 volt, 60 Hz AC power supply or a 220 volt, 50 Hz AC power supply.

In another embodiment, capacitors are used in combination with batteries, and in a further embodiment, capacitors are used instead of batteries. For example, ultra-capacitors can take a charge and release it at a faster rate, and in some applications, ultra-capacitors can be superior to batteries in delivering load currents to the motor when accelerating. Power management and electronic controls for capacitors can be simpler than for batteries.

Figure 10:
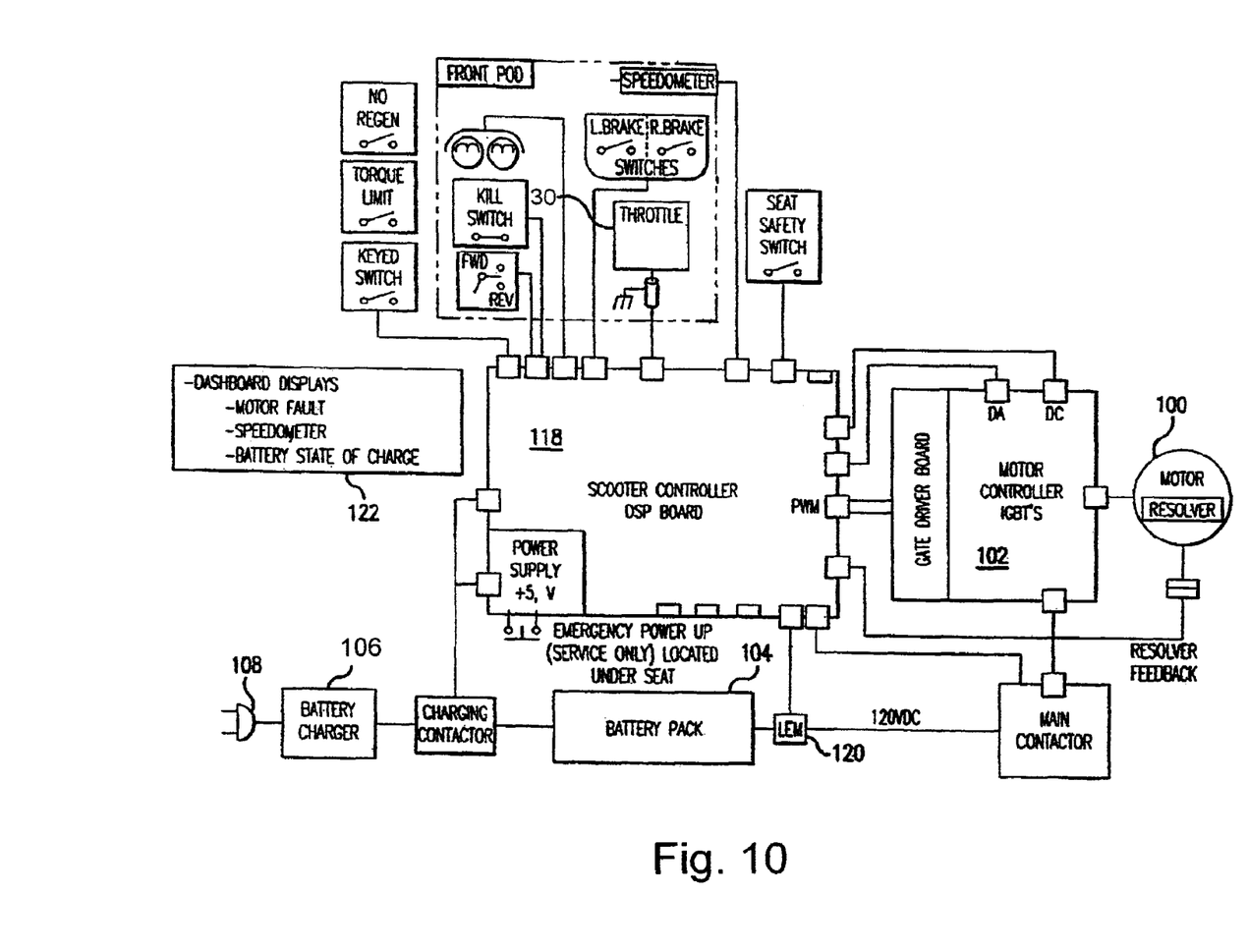
FIG. 10 is a block diagram of an electrical system thereof.

FIG. 10 illustrates the scooter motor controller 102 of the preferred embodiment in conjunction with the scooter motor 100 and the battery pack 104. Motor controller 102 preferably includes three IGBTs (insulated gate bipolar transistors). These IGBTs preferably have a peak rating of about 400 amps and about 600 volts in this embodiment, and can sustain a maximum continuous current of about 100 amps. The input voltage applied to the IGBTs in this preferred setup is the 120 volt nominal battery bank 104, which can be implemented either as lead-acid batteries typically having about a 80-130 volt operating range, Ni—Zn batteries having about a 90-140 volt operation range, or other types of batteries, such as Ni-MH.

In the embodiment of FIG. 10, the throttle can serve the dual role of demanding vehicle acceleration and also regenerative braking. The throttle 30 is preferably a bi-directional twist grip throttle. Rotation of the throttle 30 in the forward travel side from the neutral position demands vehicle acceleration, and rotation of the throttle 30 in the reverse travel side from the neutral position demands regenerative braking or reverse vehicle acceleration, depending on the configuration of the vehicle power control assembly.

Additionally, rotation of the handle from the neutral position in the reverse side can include a plurality of subranges. For instance, movement over a first subrange can demand regenerative braking, and movement over a second subrange can demand another type of braking. In one example, the first subrange can include a rotational displacement within about the first 25% or 10% of the range, and the second subrange can include a displacement within the remaining range of motion.

In another embodiment, the throttle 30 is capable of rotating from the resting neutral position about the handle in a first direction only (i.e., non-bidirectional). The first direction can include single or multiple subranges with each subrange of the throttle 30 providing different functionality. In one embodiment, the first direction is limited to a single subrange and rotation of the throttle 30 in the first direction provides forward propulsion power. In another embodiment, first direction includes multiple subranges and rotation of the throttle 30 in the first direction from the resting position over a first subrange to a first rotation position can demand regenerative braking, and further rotation of the handle from the first rotation position over a second subrange to a second rotation position can demand vehicle acceleration. In one example, the first subrange can include a rotational displacement preferably within about the first 5% to 15% of the total range, more preferably within about 10% of the total range, and the second subrange can include a displacement within the remaining range of motion. In another embodiment, a brake control, such as a hand lever or foot pedal, with a first portion of the brake control travel, such as about 10%, activates regenerative braking, and further actuation activates one or more different types of braking, such as friction braking, in addition to or instead of the regenerative braking. In a further embodiment, the first direction includes a single range only and positioning of the throttle 30 in this direction provides forward propulsion power.

Also, the throttle 30 can allow the vehicle to have reverse capability, such as for very low-speed maneuvering (for example, at speeds with feet on the ground), although other vehicles can have varying reverse speeds. In the preferred embodiment, maximum driving torque in reverse is greatly reduced compared to forward driving torque, and the vehicle speed is limited to about 5 mph or to a walking speed. In one embodiment, the rider can preferably enable reverse operation via a switch on the handlebars. In another embodiment, the twist-grip throttle 30 operates the vehicle in reverse when a switch on the handlebars is positioned in reverse mode. In yet another embodiment, controller 118 determines whether the motor is operated for regenerative braking or reverse power. This determination can be made, for example, depending on the present speed of the vehicle (vehicle preferably includes speed sensor connected to the controller 118). Preferably, twisting the handgrip in the counter-clockwise direction when viewed from the right-hand side of the vehicle will control forward throttle, while twisting the handgrip in the opposite direction will control regenerative braking in normal forward operating mode, and reverse torque in reverse mode.

In another embodiment, rider controlled regenerative braking demand is managed by an actuating device that is separate from the vehicle acceleration throttle 30. The separate actuating device can be another hand-brake, a thumb lever, or a foot pedal, among others. In this embodiment, the throttle is used only for forward or reverse power.

The term "about," as used herein, should generally be understood to refer to both the corresponding number and a range of numbers. Moreover, all numerical ranges herein should be understood to include each whole integer within the range.

While illustrative embodiments of the invention are disclosed herein, it will be appreciated that numerous modifications and other embodiments can be devised by those skilled in the art. Features of the embodiments described herein, can be combined, separated, interchanged, and/or rearranged to generate other embodiments. Therefore, it will be understood that the appended claims are intended to cover all such modifications and embodiments that come within the spirit and scope of the present invention.

What is claimed is:

1. A vehicle power control, comprising:
   a throttle mounting portion;
   a throttle movably mounted to the throttle mounting portion and configured for manipulation and operation by a rider; and
   a sensor in contactless association with at least one of the throttle and throttle mounting portion, the sensor configured for sensing a position of the throttle with respect to the mounting portion, in the contactless association, and generating a signal based on the sensed position for controlling motive power of a vehicle,
   wherein the sensor is configured for sensing an absolute position of the throttle without requiring movement of the throttle.

2. A vehicle power control, comprising:
   a throttle mounting portion;
   a throttle movably mounted to the throttle mounting portion and configured for manipulation and operation by a rider;
   a sensor in contactless association with at least one of the throttle and throttle mounting portion, the sensor configured for sensing a position of the throttle with respect to the mounting portion, in the contactless association, and generating a signal based on the sensed position for controlling motive power of a vehicle; and
   a magnetic member having a magnetic field and associated with at least one of the throttle and the throttle mounting portion, wherein the sensor is configured to sense the magnetic field to sense the position of the throttle.

3. The power control of claim 2, wherein the sensor is configured for sensing the orientation of the magnetic field to sense the position of the throttle.

4. The power control of claim 2, wherein the magnetic member comprises a permanent magnet.

5. The power control of claim 2, wherein the magnetic member has magnetic poles disposed so that the magnetic field at the sensor changes orientation as the throttle is moved.

6. The power control of claim 5, wherein the throttle is rotatable about an axis, and the magnetic poles are disposed at different radial and circumferential locations with respect to the axis.

7. The power control of claim 6, wherein the sensor comprises a differential Hall effect sensor configured for sensing an absolute orientation of the magnetic field without requiring movement of the throttle.

8. The power control of claim 5, wherein the magnetic poles are disposed at different eccentric locations with respect to the axis.

9. The power control of claim 5, further comprising:
   a support member supporting one of the magnetic member and sensor for moving said one with respect to the other to orient the magnetic field in a predetermined orientation when the throttle is in a predetermined position; and a locking member configured for locking the support member in said predetermined position when such position is obtained to retain said orientation of the magnetic member with respect to the sensor with the throttle in said predetermined position for calibrating the sensor.

10. The power control of claim 9, further comprising a threaded member having threads and fixed to the throttle, wherein:

the support member is in threaded association with the threaded member and comprises first and second threaded portions that are flexible with respect to each other and that are in said threaded association; and the locking member is configured for flexing the first and second flexible portions with respect to each other for gripping threads of the threaded member to rotationally lock the support member with respect to the throttle.

11. The power control of claim 10, wherein the locking member comprises a fastener.

12. A vehicle power control, comprising:
a throttle mounting portion;
a throttle movably mounted to the throttle mounting portion and configured for manipulation and operation by a rider;
a sensor in contactless association with at least one of the throttle and throttle mounting portion, the sensor configured for sensing a position of the throttle with respect to the mounting portion, in the contactless association, and generating a signal based on the sensed position for controlling motive power of a vehicle, and the signal is a pulse-width modulated signal in which the pulse width is related to the sensed position.

13. A vehicle power control, comprising:
a throttle mounting portion;
a throttle movably mounted to the throttle mounting portion and configured for manipulation and operation by a rider;
a sensor in contactless association with at least one of the throttle and throttle mounting portion, the sensor configured for sensing a position of the throttle with respect to the mounting portion, in the contactless association, and generating a signal based on the sensed position for controlling motive power of a vehicle; and
a throttle biasing assembly to resiliently bias the throttle towards a neutral position with respect to the sensor, the biasing assembly being configured for applying a lesser bias to the throttle toward the neutral position when the throttle is displaced from the neutral position on a first side thereof than when the throttle is displaced from the neutral position on a second side thereof.

14. The power control of claim 13, wherein rotation of the throttle from the neutral position in the first side demands acceleration, and rotation in the second side demands regenerative braking or reverse power.

15. The power control of claim 13, wherein the biasing assembly comprises:
a first biasing member configured to bias the throttle in a first direction from the first side toward the neutral; and
a second biasing member configured to bias the throttle in a second direction, opposite the first direction, to provide the greater bias when the throttle is on the second side than on the first side.

16. The power control of claim 13, wherein the biasing assembly is configured such that:
the first biasing member is in biasing association with the throttle when the throttle is on both the first and second sides; and
the second biasing member is in biasing association with the throttle when the throttle is on the second side and is disengaged from the throttle when the throttle is on the first side.

17. A vehicle power control, comprising:
a throttle mounting portion;
a throttle movably mounted to the throttle mounting portion and configured for manipulation and operation by a rider;
a sensor in contactless association with at least one of the throttle and throttle mounting portion, the sensor configured for sensing a position of the throttle with respect to the mounting portion, in the contactless association, and generating a signal based on the sensed position for controlling motive power of a vehicle, and the sensor is mounted to the throttle mounting portion and is in the contactless association with the throttle.

18. A vehicle, comprising:
a vehicle power control including:
a throttle mounting portion;
a throttle movably mounted to the throttle mounting portion and configured for manipulation and operation by a rider;
a sensor in contactless association with at least one of the throttle and throttle mounting portion, the sensor configured for sensing a position of the throttle with respect to the mounting portion, in the contactless association, and generating a signal based on the sensed position for controlling motive power of a vehicle;
a motor configured for providing motive power to the vehicle; and
a controller connected to receive the signal from the sensor and to cause the motor to operate at a power level depending on the position of the throttle.

19. The vehicle of claim 18, further comprising handle bars configured for steering the vehicle, wherein the sensor is associated with the handle bars, and the throttle is a twist throttle mounted to the handle bars for operating the throttle and steering the handle bars.

20. A vehicle power control, comprising:
a throttle mounting portion;
a throttle movably mounted to the throttle mounting portion and configured for manipulation and operation by a rider;
a sensor in association with at least one of the throttle and throttle mounting portion, the sensor configured for sensing a position of the throttle with respect to the mounting portion, and generating a signal based on the sensed position for controlling motive power of a vehicle; and
a throttle biasing assembly to resiliently bias the throttle towards a neutral position with respect to the sensor, the biasing assembly being configured for applying a lesser bias to the throttle toward the neutral position when the throttle is displaced from the neutral position on a first side thereof than when the throttle is displaced from the neutral position on a second side thereof;
wherein the biasing assembly comprises:
a first biasing member configured to bias the throttle in a first direction from the first side toward the neutral; and
a second biasing member configured to bias the throttle in a second direction, opposite the first direction, to provide the greater bias when the throttle is on the second side than on the first side.

* * * * *